United States Patent [19]
Romanato et al.

[11] Patent Number: 5,647,150
[45] Date of Patent: Jul. 15, 1997

[54] METHOD FOR MANUFACTURING FOOTWEAR BY INJECTION-MOLDING, AND FOOTWEAR OBTAINED WITH SAID METHOD

[75] Inventors: Mariarosa Romanato, Stra; Riccardo Perotto, Volpago del Montello, both of Italy

[73] Assignee: Nordica S.p.A., Trevignano, Italy

[21] Appl. No.: 545,719

[22] PCT Filed: Mar. 8, 1995

[86] PCT No.: PCT/EP95/00854

§ 371 Date: Nov. 2, 1995

§ 102(e) Date: Nov. 2, 1995

[87] PCT Pub. No.: WO95/24305

PCT Pub. Date: Sep. 14, 1995

[30] Foreign Application Priority Data

Mar. 9, 1994 [IT] Italy ................... TV94A0028

[51] Int. Cl.⁶ ............... A43B 23/00; A43B 5/04; A43D 9/00
[52] U.S. Cl. .............. 36/117.1; 36/45; 36/3 A; 12/142 R; 12/146 C
[58] Field of Search .......... 36/117.1, 45, 3 A; 12/142 R, 146 C, 142 E, 142 EV, 142 P

[56] References Cited

U.S. PATENT DOCUMENTS

| | | | |
|---|---|---|---|
| 1,891,021 | 12/1932 | Burdotti | 36/3 A |
| 2,034,091 | 3/1936 | Dunbar | 36/45 |
| 2,494,964 | 1/1950 | Rome | 36/117.1 |
| 4,222,183 | 9/1980 | Haddox | 36/45 |
| 4,447,967 | 5/1984 | Zaino | 36/45 |
| 4,693,021 | 9/1987 | Mazzarolo | 36/3 A |
| 5,365,679 | 11/1994 | Chemello | 36/50.5 |

FOREIGN PATENT DOCUMENTS

| | | |
|---|---|---|
| 2077184 | 10/1971 | France. |
| 2484215 | 12/1981 | France. |
| 1971924 | 11/1967 | Germany. |
| 1426776 | 3/1976 | United Kingdom. |
| 9206608 | 4/1992 | WIPO. |

*Primary Examiner*—M. D. Patterson
*Attorney, Agent, or Firm*—Guido Modiano; Albert Josif

[57] ABSTRACT

A method of manufacturing footwear, including the steps of positioning a sock portion over a mold element in which the sock portion comprises a fabric layer and a thermoplastic film layer connected to the fabric layer, such that the thermoplastic film layer is positioned between the mould element and the fabric layer, and injection-molding a thermoplastic material to the sock portion positioned over the mold element such that heated thermoplastic material flows through the fabric layer and bonds with the thermoplastic film layer and such that the thermoplastic material at least partially covers the fabric layer for forming a portion of an item of footwear.

12 Claims, 5 Drawing Sheets

5,647,150

METHOD FOR MANUFACTURING FOOTWEAR BY INJECTION-MOLDING, AND FOOTWEAR OBTAINED WITH SAID METHOD

TECHNICAL FIELD

The present invention relates to a method for manufacturing footwear by injection-molding and to footwear obtained with said method.

BACKGROUND ART

Nowadays it is known to manufacture shoes, such as for example ski boots, which usually comprise a shell and at least one quarter, made of plastics, with which soft inner-boots are associated to increase the user's comfort.

Equally, it is known to manufacture sports shoes, such as for instance for trekking or climbing, which are usually constituted by a sole with which a shell or upper is associated; a lining or a padding or a sock is inserted or stitched inside the shell or upper.

These known solutions have some drawbacks: first of all assemblying the upper and the lining with basically manual operations, such as stitching, gluing, or welding, entails long production times which consequently lead to high production costs.

Furthermore, the use of plastics makes the shell or upper to be considerably rigid. Accordingly, while on one hand the technical features of the shoe can be improved, on the other hand the user's comfort and foot transpiration are impaired.

Furthermore, the use of stitches makes the shoe permeable to water.

In order to overcome these drawbacks it is known for example to manufacture overlap-style shells for ski boots: however, this entails another problem linked to the waterproofing of the shell and to the thermal insulation thereof.

DISCLOSURE OF THE INVENTION

A principal aim of the present invention is therefore to solve the described technical problems, eliminating the drawbacks of the prior art, by providing a method for obtaining a shoe which has parts manufactured by injection-molding, has a low overall manufacturing cost, and has, at the same time, optimum waterproofing for the user's foot.

Within the scope of the above mentioned aim, an important object is to provide a method which allows to obtain a shoe having optimum thermal insulation and at the same time optimum transpiration for the user's foot.

Another object is to provide a method which allows to improve the industrialization for producing the shoe.

Another object is to provide a method which allows to obtain an aesthetically improved shoe.

The above mentioned aim and objects, as well as others which will become apparent hereinafter, are achieved by a method and by a footwear item as claimed in the appended claims.

BRIEF DESCRIPTION OF THE DRAWINGS

Further characteristics and advantages of the invention will become apparent from the following detailed description of some particular but not exclusive embodiments thereof, illustrated only by way of non-limitative example in the accompanying drawings, wherein.

WAYS OF CARRYING OUT THE INVENTION

Figure 1:
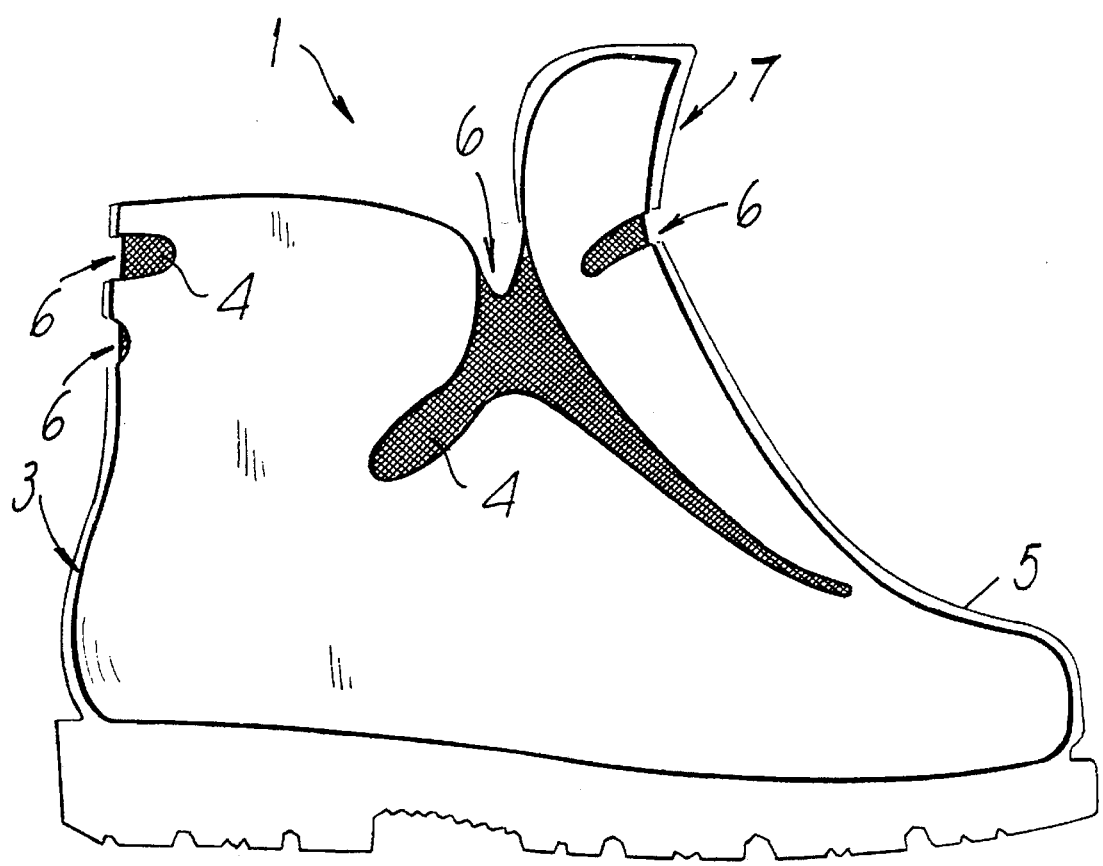
FIG. 1 is a side view of a shoe shell or upper, for trekking, mountaineering, or cross-country skiing, manufactured according to the method.

With reference to the figures, the reference numeral 1 generally designates a shoe comprising a sole 2 with which a shell or upper 3 is associated so as to obtain a shoe for trekking, mountaineering, or cross-country skiing.

The method for obtaining this shoe entails, at least regarding the shell or upper 3, a first step in which at least one sock 4 or one or more portions of sock or a piece of fabric or a padding is positioned at one or more molds.

Specifically, the material for manufacturing the sock can be constituted by natural hide, polyester or mixed-polyester fabric with a membrane known by the trade-name "TEFLON", or fabrics known by the trade-name "GORE-TEX", or materials known by the trade-names "KEVLAR" and "CORDURA", produced by Du Pont.

The material for the sock can also be constituted by a polyurethane or polyamide fabric treated with heat-adhesive films, for example coupled to meshes of polyester or EVA or known by the trade-name PEBAX, the latter being produced by BAYER.

Figure 6:
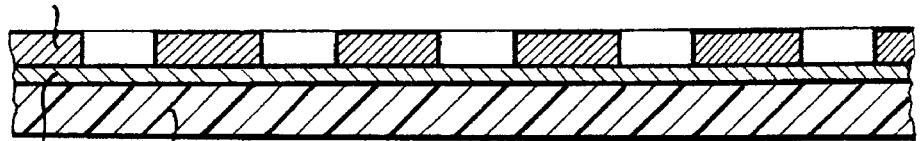
FIG. 6 is a sectional view of a particular combination.

In particular, research has shown that the best composition of the fabric for ensuring optimum cohesion between the sock and the shell or upper 3 is constituted by a sheet 8 of a material that can be of various kinds (polyester, EVA, leather, metal, or others) provided that it has a grid-like structure and can be coextruded with a film 9 of thermoplastic material (polyurethane, polyethylene, nylon, or others) which may have any weight per unit volume, provided that it is compatible with the thermoplastic material which will be subsequently injection-molded in place; advantageously, it is possible to provide, on the opposite side of a grid-like sheet 8, a protective fabric 10 for a thermoplastic film 9, as shown in FIG. 6.

The method includes a second step in which thermoplastic material is injection-molded in place at least once on one or more regions of said sock 4 or on said one or more portions of sock or fabric or padding, generally designated by the reference numeral 5. Once it has cooled, the thermoplastic material is suitable to form the shell or upper 3 together with the sock 4 that is coupled thereto.

Figure 7:
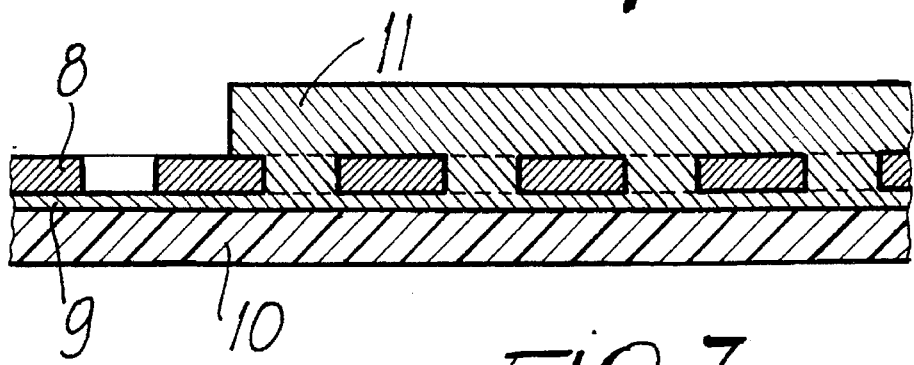
FIG. 7 is a view, similar to the preceding one, of a further combination.

The use of a material according to the composition shown in FIG. 6 for the sock or for part thereof allows to achieve optimum anchoring of said sock or sock portion to the shell or upper 3, by virtue of the flow of injected thermoplastic material which occurs through the holes formed in the grid-like sheet 8, during the injection-molding step. Cohesion is thus produced due to melting between this material and the material of the thermoplastic film 9 which lies below the sheet 8, as shown in FIG. 7, where the molded-in-place thermoplastic material is designated by the reference numeral 11; this cohesion ensures the tight mutual coupling of the two components, namely the sock or portion thereof and the shell or upper.

Figure 2:
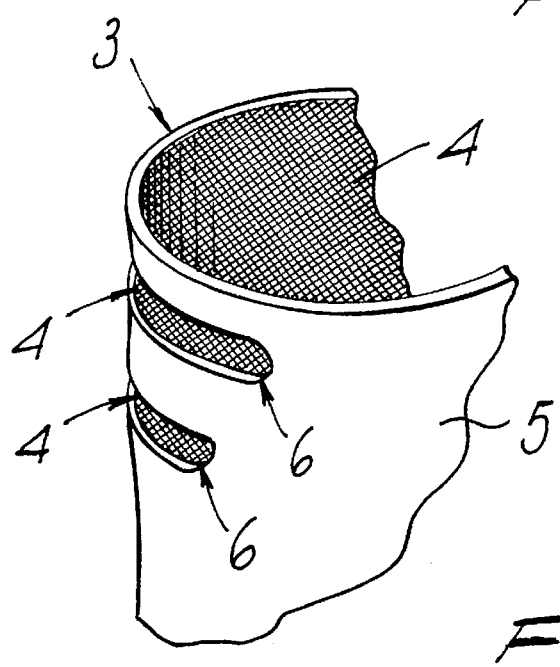
FIG. 2 is a perspective partial rear view of the shoe of the preceding figure.

A shoe is thus obtained which has one or more free regions or openings 6 which affect, in the particular embodiment shown in FIGS. 1 and 2, a rear region above the heel and a region that transversely affects a front tongue 7 and a region where said tongue 7 joins the remaining rigid or semirigid parts that constitute the shell or upper 3.

The thermoplastic material 5 is therefore missing at said one or more regions or openings 6, but said regions or openings are closed by virtue of the underlying sock 4 or portion of sock or fabric or padding.

Therefore, the shoe thus obtained is internally provided with parts made of fabric or with a sock or with a padding having the most appropriate characteristics according to the use for which they are meant and an external structural part which is made of plastics.

The sock 4 can also be obtained by cutting flat materials, such as for example fabric, hide, or extruded materials, subsequently assembled by stitching or welding or weaving by means of circular looms.

The characteristics of said socks or fabric or padding may vary, according to the requirements, as a function of the structure of the fabric or of the material being used: it is thus possible to obtain transpiration, thermal insulation, waterproofing, or the combination of these characteristics if one or more portions of fabric or sock having different characteristics or made of different materials are placed at the mold.

Accordingly, it is thus possible to simultaneously provide optimum heat insulation as well as optimum waterproofing and optimum transpiration at the regions or openings 6.

It has thus been observed that the method and the shoe have achieved the intended aim and objects, since the method allows to obtain a shoe at a lower cost, since it is possible to eliminate manual operations, such as the stitching between the hide or plastic upper and the lining, which considerably increase the production time.

Figure 3:
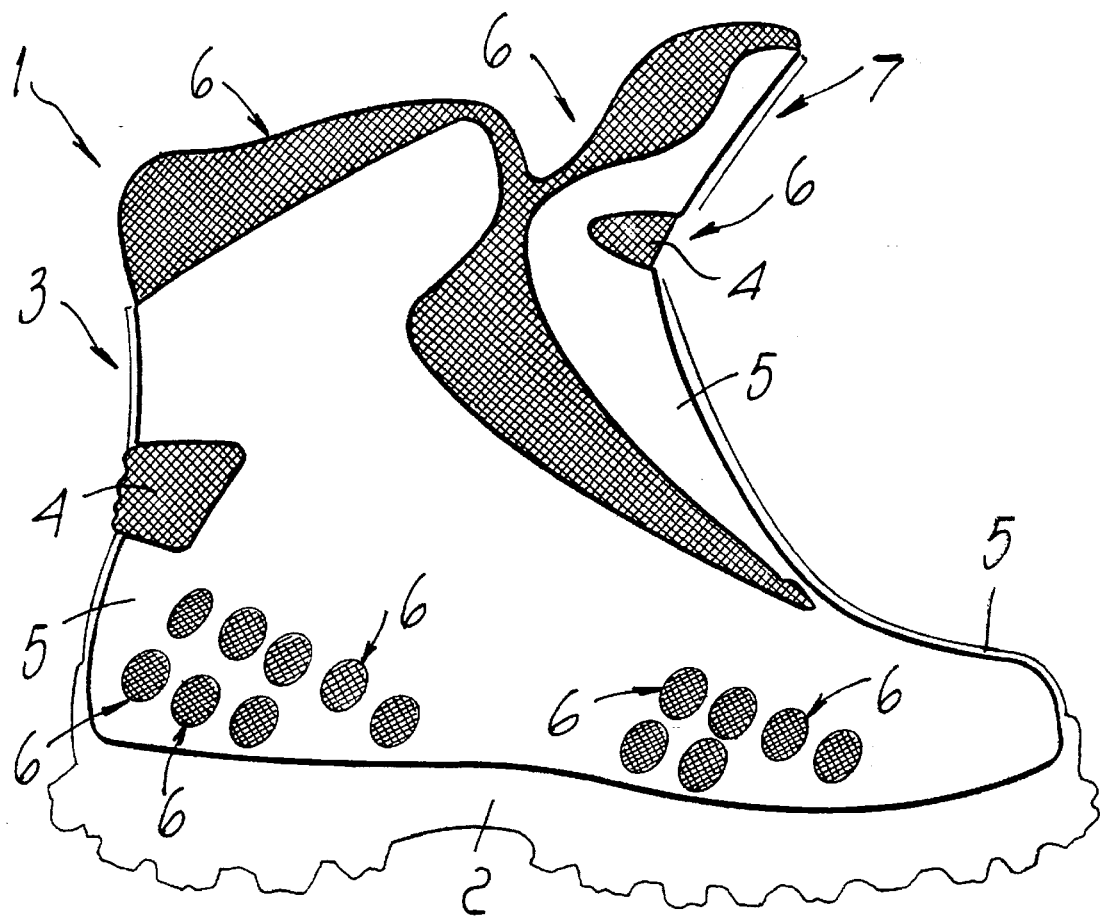
FIG. 3 is a side view of a shoe shell or upper, for trekking, skating, or leisure, according to a further aspect of the invention.

It is also possible to obtain regions or openings 6 that have a desired width or constitute aesthetic elements, as shown in FIG. 3, where in a shoe, which can be meant for trekking, skating or leisure, the openings 6 form lightening regions and/or regions for transpiration.

The method therefore provides a considerable improvement to the industrialization of the product, leading to a large reduction in production costs since the cycle is shorter although the shoe thus obtained maintains an excellent quality regarding its technical characteristics.

The structure thus obtained can in fact have optimum waterproofing characteristics at the free regions or openings 6, and can at the same time allow optional transpiration of the shoe; at the same time, the structure can be provided with optimum thermal insulation by interrupting the continuity of the plastics, which is not very comfortable at low temperatures since it is a good heat conductor. This plastics is replaced, for example, with a fabric having better thermal insulation characteristics.

The above-mentioned characteristics can be provided individually or in combination, according to the material or the structure of the fabric being utilized.

Finally, the method allows to obtain footwear which has better quality standards, since the processing steps have been reduced and therefore the likelihood of rejects is lower.

The method and the shoe obtained thereby can of course be susceptible of numerous modifications and variations, all of which are within the scope of the same inventive concept.

Figure 4:
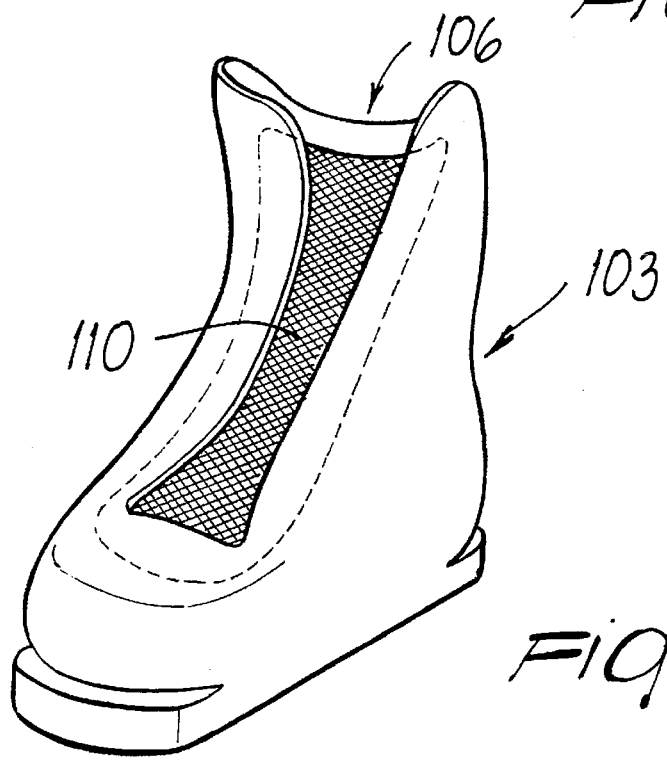
FIG. 4 is a front perspective view of a shell of an overlap-style ski boot, according to a further aspect of the invention.

Thus, for example, FIG. 4 illustrates a shell 103 for a ski boot which has a longitudinal recess 106 formed at the region above the metatarsal region and the foot instep.

In the illustrated embodiment, the longitudinal recess 106 is closed by means of the portion of fabric 110 where the plastic material has not been molded in place.

An appropriate padding can be associated with said portion of fabric 110 and can therefore act as a seal against the infiltration of water or snow or, on the inside, provide adaptation to the anatomical shape of the foot.

Figure 8:
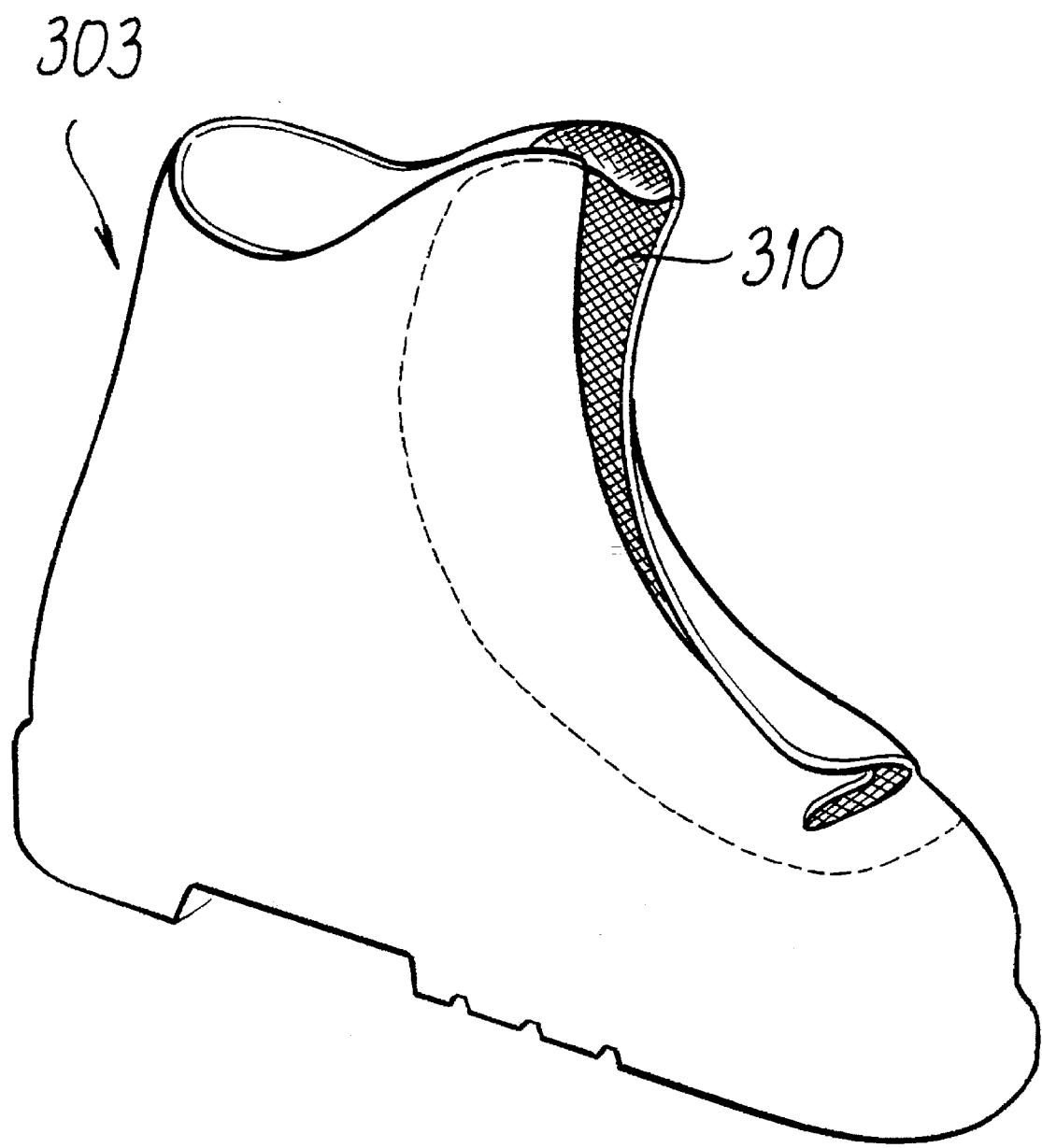
FIG. 8 is a perspective side view of a shoe shell according to a further aspect of the invention.

As an alternative, as shown in FIG. 8, said portion of fabric 310 can be associated with an overlap-style shell 303 so as to still constitute an element for mutually connecting the flaps which allows to move them apart or overlap them and at the same time prevents the infiltration of water or snow or, on the inside, provide adaptation to the anatomical shape of the foot.

Figure 5:
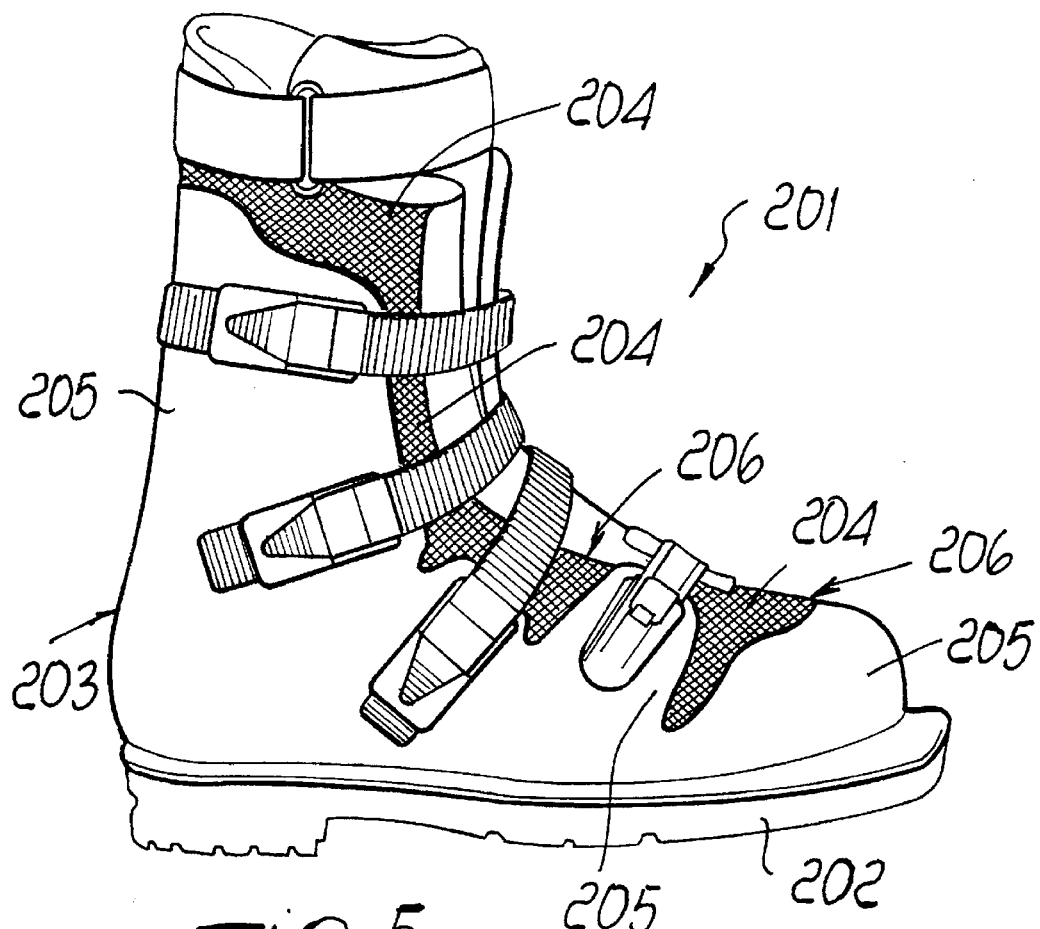
FIG. 5 is a side view, of a shell or upper of a ski boot for mountaineering, snowboarding, or Telemark skiing, according to still a further aspect of the invention.

FIG. 5 illustrates a shoe 201, for example for mountaineering or snowboarding or Telemark skiing, which is constituted by a sole 202 with which a shell 203 obtained by injection-molding thermoplastic material 205 is associated; said shell surrounds the rear lateral region of the foot as well as partially the tip of said foot, and free regions 206 are instead formed at the metatarsal and instep regions of the foot; the sock or fabric 204 is visible in these regions 206 and it can have waterproofing and thermal insulation characteristics.

Figure 9:
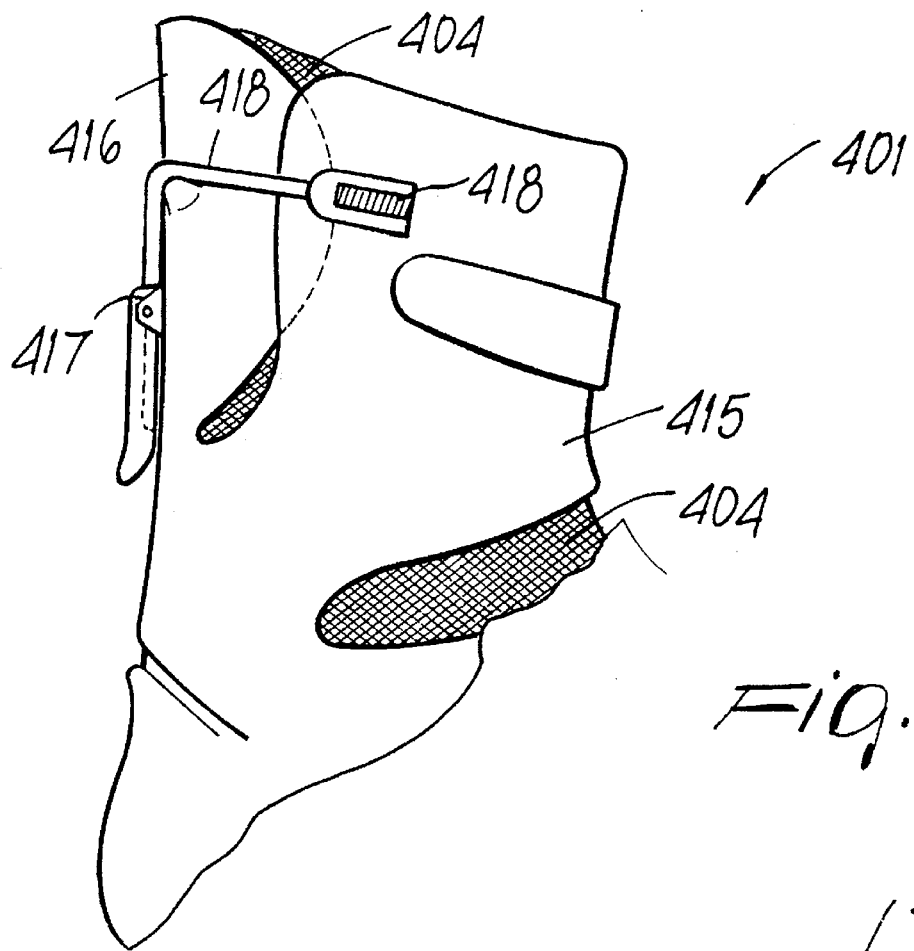
FIG. 9 is a partial side view of a boot according to a further aspect of the invention.
Figure 10:
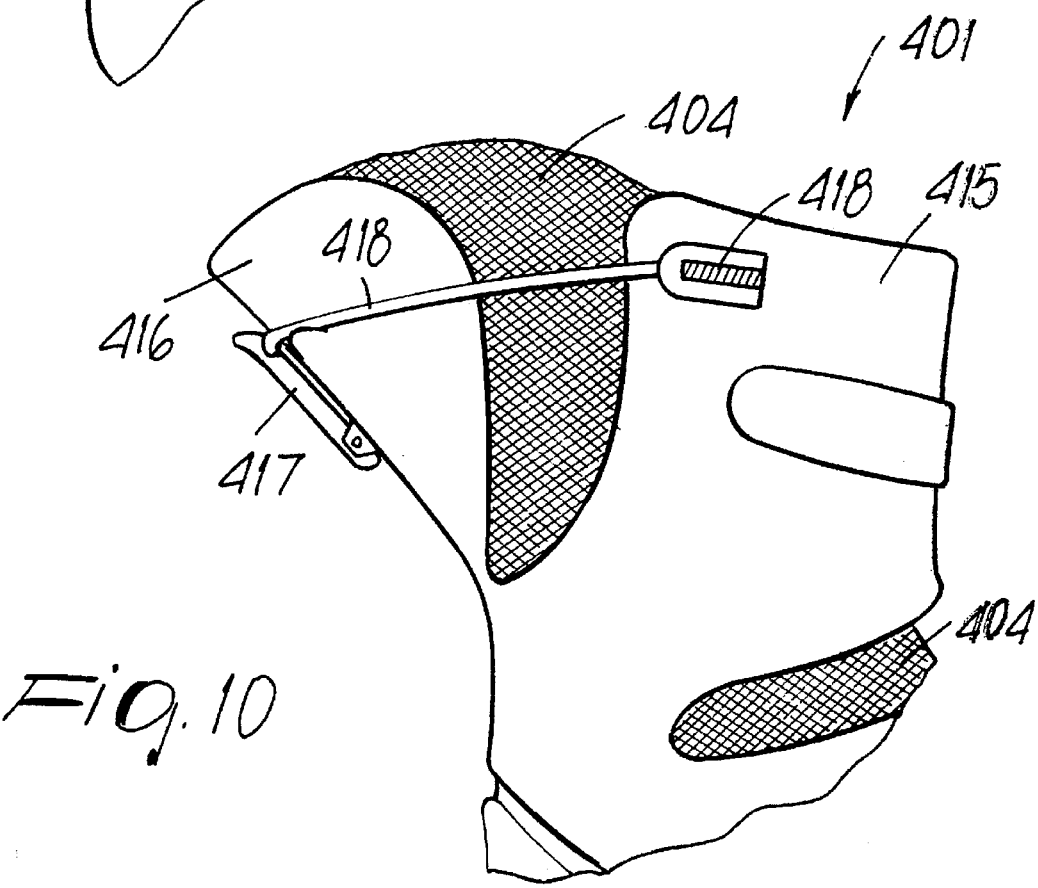
FIG. 10 is a partial enlarged side view of the boot of the preceding figure in the open position.

FIGS. 9, 10 show a ski boot 401 obtained by the method of the invention. The boot 401 includes an upper 415 having a rear flap 416 obtained monolithically. A sock, or fabric 404 is provided inside the upper, as described above.

A lever, or other suitable device, 417, cooperates with a traction member 418 for closing and opening the rear flap 416 as shown in the figures.

A per se known adjuster 418 may be provided at the traction member.

The materials and the dimensions that constitute the individual components of the invention may of course be the most pertinent according to the specific requirements.

We claim:

1. A method of manufacturing footwear, comprising the steps of:

positioning a sock portion over a mold element in which said sock portion comprises a fabric layer and a thermoplastic film layer connected to the fabric layer, such that the thermoplastic film layer is positioned between the mould element and the fabric layer; and injection-molding a thermoplastic material to said sock portion positioned over the mold element such that heated thermoplastic material flows through the fabric layer and coheres with the thermoplastic film layer and such that the thermoplastic material at least partially covers the fabric layer for forming a portion of an item of footwear.

2. The method of claim 1 wherein the step of positioning a sock portion over a mold element includes positioning a sock portion which further comprises a protective fabric layer connected to the thermoplastic film layer, such that the protective fabric layer is positioned in contact with the mold element.

3. The method of claim 1 wherein the step of positioning a sock portion over a mold element includes positioning a sock portion in which the fabric layer is constituted by a grid-like sheet.

4. The method of claim 1 further including the step of forming open regions of the sock portion which are unaffected by the thermoplastic material.

5. An item of footwear which is manufactured according to a process comprising the steps of:

positioning a sock portion over a mold element in which said sock portion comprises a fabric layer and a thermoplastic film layer connected to the fabric layer, such that the thermoplastic film layer is positioned between the mould element and the fabric layer; and injection-molding a thermoplastic material to said sock portion positioned over the mold element such that heated thermoplastic material flows through the fabric layer and bonds with the thermoplastic film layer;

wherein the item of footwear includes a portion formed by said sock portion and a layer of thermoplastics material which at least partially covers the fabric layer of said sock portion; and wherein said portion of the item of footwear includes a cohered thermoplastics material portion formed of portions of said thermoplastic material and said thermoplastic film layer.

6. The item of footwear of claim 5 wherein said sock portion further comprises a protective fabric layer connected to the thermoplastic film layer opposite said fabric layer.

7. The item of footwear of claim 5 wherein the said fabric layer is constituted by a grid-like sheet.

8. The item of footwear of claim 7 wherein said sock portion is constituted by said grid-like sheet coextruded with said thermoplastic film layer.

9. The item of footwear of claim 5 further comprising open regions of the sock portion which are unaffected by the thermoplastic material.

10. The item of footwear of claim 9 wherein said open regions comprise an open region arranged at a metatarsal region of the item of footwear.

11. The item of footwear of claim 9 wherein said open regions comprise an open region arranged at an instep region of the item of footwear.

12. The item of footwear of claim 9 wherein said open regions comprise an open region arranged at a rear region above a heel region of the item of footwear.

* * * * *